(12) United States Patent
Wright et al.

(10) Patent No.: US 7,167,956 B1
(45) Date of Patent: Jan. 23, 2007

(54) AVOIDING INCONSISTENCIES BETWEEN MULTIPLE TRANSLATORS IN AN OBJECT-ADDRESSED MEMORY HIERARCHY

(75) Inventors: Gregory M. Wright, Mountain View, CA (US); Mario I. Wolczko, San Carlos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 360 days.

(21) Appl. No.: 10/838,309

(22) Filed: May 3, 2004

(51) Int. Cl.
*G06F 12/10* (2006.01)
(52) U.S. Cl. ...................... 711/141; 711/206
(58) Field of Classification Search ............... 711/141
See application file for complete search history.

(56) References Cited

U.S. PATENT DOCUMENTS 6,484,240 B1 * 11/2002 Cypher et al. .............. 711/141
6,526,481 B1 * 2/2003 Shen et al. .................. 711/147
6,633,967 B1 * 10/2003 Duncan ....................... 711/207

* cited by examiner

*Primary Examiner*—Sanjiv Shah
*Assistant Examiner*—Arpan Savla

(74) *Attorney, Agent, or Firm*—Park, Vaughan & Fleming, LLP

(57) ABSTRACT

One embodiment of the present invention provides a system that avoids inconsistencies between multiple translators in an object-addressed memory hierarchy. This object-addressed memory hierarchy includes an object cache, which supports references to object cache lines based on object identifiers instead of physical addresses. During operation, the system receives a read-to-share (RTS) signal for an object cache line, wherein the RTS signal is received from a requesting processor as part of a cache-coherence operation. If no processor owns the object cache line, the system causes the requesting processor to become the owner of the object cache line instead of merely holding a copy the object cache line in the shared state. The system also generates a translation for the object cache line in a translator associated with the requesting processor, wherein the translation maps an object identifier and a corresponding offset to a physical address for the object cache line and reconstructs the contents of the object cache line by reading from memory at that physical address. In this way, if the requesting processor owns the object cache line, a subsequent processor that requests the same object cache line will receive the object cache line from the requesting processor, and will not generate an additional translation for the object cache line. This ensures that multiple translators will not generate inconsistent translations for the same object cache line.

18 Claims, 8 Drawing Sheets

AVOIDING INCONSISTENCIES BETWEEN MULTIPLE TRANSLATORS IN AN OBJECT-ADDRESSED MEMORY HIERARCHY

BACKGROUND

1. Field of the Invention

The present invention relates to the design of computer systems that support references to objects defined within an object-oriented programming system. More specifically, the present invention relates to a method and an apparatus that avoids inconsistencies between multiple translators, which translate object identifiers into corresponding physical addresses in an object-addressed memory hierarchy.

2. Related Art

As object-oriented programming languages become more widely used, computer systems are being designed to manipulate objects more efficiently. In particular, some proposed object-addressed memory hierarchies include object caches that facilitate lookups for object-addressed cache lines ("object cache lines") based on location-independent object identifiers (OIDs) without having to first translate the OIDs into corresponding physical addresses.

When object-addressed cache lines are eventually written out to physical memory, they are typically mapped to actual physical address locations by a translator, which is interposed between one or more object caches and physical memory. This translator intercepts cache misses for object cache lines and converts reads or writes to objects into reads or writes to corresponding physical memory locations.

In some systems, it is desirable to provide multiple translators that work together to perform the translations. For example, it may be advantageous to integrate a translator into the same semiconductor die as an associated processor. Hence, if such a system includes multiple processors on multiple semiconductor dies, the system will include multiple translators.

If there exist multiple translators, coherence problems can potentially arise between the translators. For example, if two translators process an eviction for the same cache line at the same time, it is possible for the two translators to concurrently generate inconsistent translations for the same object cache line.

Hence, what is needed is a method and an apparatus that avoids inconsistencies between multiple translators in an object-addressed memory hierarchy.

SUMMARY

One embodiment of the present invention provides a system that avoids inconsistencies between multiple translators in an object-addressed memory hierarchy. This object-addressed memory hierarchy includes an object cache, which supports references to object cache lines based on object identifiers instead of physical addresses. During operation, the system receives a read-to-share (RTS) signal for an object cache line, wherein the RTS signal is received from a requesting processor as part of a cache-coherence operation. If no processor owns the object cache line, the system causes the requesting processor to become the owner of the object cache line instead of merely holding a copy of the object cache line in the shared state. The system also generates a physical address for the object cache line in a translator associated with the requesting processor, wherein the translator maps an object identifier and a corresponding offset to a physical address for the object cache line. The translator then completes the read translation by reconstructing the contents of the object cache line, reading from the physical memory. In this way, because the requesting processor owns the object cache line, a subsequent processor that requests the same object cache line will receive the object cache line from the requesting processor, and will not generate an additional translation for the object cache line. This ensures that multiple translators will not generate inconsistent translations for the same object cache line.

In a variation on this embodiment, if another processor owns the object cache line, the other processor forwards the object cache line to the requesting processor, and the requesting processor holds a copy of the object cache line in the shared state.

In a variation on this embodiment, the system uses a corresponding object identifier and offset to look up directory information specifying where copies of the object cache line are located in caches in the computer system. In this variation, the system causes the requesting processor to become the owner of the object cache line by updating the directory information to indicate that the requesting processor is the owner of the object cache line.

In a variation on this embodiment, the translator obtains the physical address for the object cache line by looking up the object table entry for the object corresponding to the object cache line in a translation cache associated with the translator. If the object table entry is not present in the translation cache, the translator generates an RTS signal to request a cache line containing the object table entry. (Note that in some variations on this embodiment the cache line containing the object table entry may be stored in objects, and these objects themselves may have corresponding object table entries in recursive fashion.)

In a variation on this embodiment, prior to sending the RTS signal for the object cache line from the requesting processor, the requesting processor directs a corresponding memory access to an object cache associated with the requesting processor. If the corresponding memory access causes a hit in the object cache, the requesting processor accesses the corresponding object cache line in the object cache and the RTS signal is not generated. If the corresponding memory access causes a miss in the object cache, the RTS signal is generated.

In a variation on this embodiment, the system evicts the object cache line from an object cache associated with the requesting processor by first holding ownership of the object cache line and not releasing ownership while the eviction takes place. Next, the system performs the eviction by writing the object cache line from the object cache to a physical memory location derived from the object table entry of the object corresponding to the object cache line, and then invalidates or otherwise overwrites an entry in the object cache for the object cache line. Finally, the system releases ownership of object cache line after the eviction completes.

In a variation on this embodiment, if the translator performs a read translation for an object cache line, and if the physical address associated with an object cache line is modified during the read translation, the read translation is aborted.

In a further variation, after the read translation is aborted, the translator retries the read translation. In doing so, the translator obtains ownership of a cache line that contains the object table entry, and does not relinquish ownership until the read translation completes. After the read translation completes, the translator releases ownership of the cache line containing the object table entry. In this way, the object cache line cannot be relocated by another processor during the retry of the read translation.

In a variation on this embodiment, object cache lines are used to store objects defined within an object-oriented programming system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Single-Translator System

Figure 1:
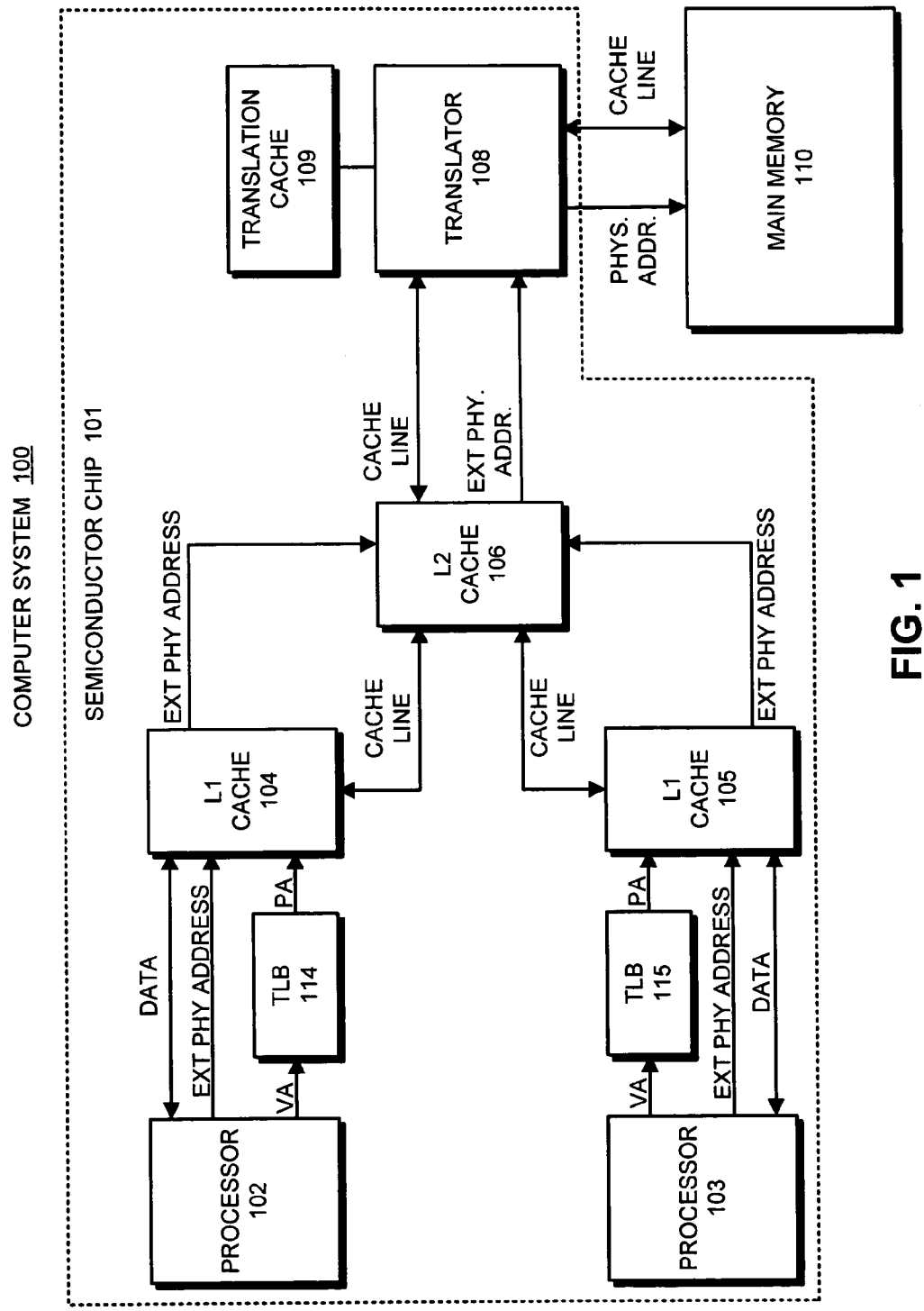
FIG. 1 illustrates a computer system in accordance with an embodiment of the present invention.

FIG. 1 illustrates a computer system 100 with an object-addressed memory hierarchy that contains only a single translator in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance.

As is illustrated in FIG. 1, computer system 100 includes processors 102 and 103 within semiconductor chip 101. Processors 102 and 103 access code and data from L1 caches 104 and 105, respectively. Note that L1 caches 104 and 105 can include unified instruction/data caches, or alternatively, separate instruction caches and data caches.

Processors 102 and 103 are associated with translation lookaside buffers (TLBs) 114 and 115, which facilitate translating virtual addresses into physical addresses for non-object references.

L1 cache 104 and L1 cache 105 make use of an extended address encoding procedure that enables L1 cache 104 to function as both a conventional cache and an object cache. For example, during a conventional load operation, a virtual address is sent from processor 102 to TLB 114. TLB 114 translates the virtual address into a physical address, which is subsequently used by L1 cache 104.

In contrast, during a load operation involving a portion of an object, processor 102 obtains the corresponding object ID (OID) and offset and combines them to create an object address. This object address is embedded into an unused portion of the physical address space to produce an encoded address. Note that the higher order bits of this encoded address are typically different than the higher order bits of any physical address. This allows the system to distinguish an encoded address from a physical address. When the encoded address is subsequently sent from processor 102 to L1 cache 104, the encoded address bypasses TLB 114 and directly enters L1 cache 104. Note that only minor modifications are required to conventional cache designs in order to provide object caching using the above-described technique.

In order to request a non-object data item, such as a value from a normal virtual address, processor 102 generates a virtual address that is sent to TLB 114. TLB 114 translates this virtual address into a physical address, which is sent to L1 cache 104.

Note that after an object address is translated into an encoded address L1 cache 104, L1 cache 105 and L2 cache 106 can treat the encoded address in the same manner as a normal physical address.

If a given data item (or instruction) is not located within L1 cache 104 or L1 cache 105, it is retrieved from L2 cache 106. If it is not located within L2 cache 106, it is pulled into L2 cache 106 from main memory 110.

Unlike in a conventional memory hierarchy, a translator 108 is interposed between L2 cache 106 and main memory 110. Translator 108 converts an object address, comprising an object ID and an offset, into a corresponding physical address, which is sent to main memory 110.

If an object is not present within L2 cache 106, the encoded address is forwarded to translator 108. Translator 108 uses a translation cache 109, which contains object table entries that translate the encoded address into a corresponding physical address. Each object table entry in translation cache 109 associates a given object ID with a corresponding physical address in main memory where the object resides. Note that copies of recently used object table entries reside in translation cache 109. Other object table entries can be found in main memory 110.

When a cache miss for an object occurs in L2 cache 106, translator 108 intercepts the encoded address and extracts the object ID. Next, translator 108 uses the object ID to index into the object table to locate an object table entry containing a corresponding physical address. Once the physical address is found, translator 108 converts the load request for the object into a load request for a physical address in main memory 110.

The system uses the physical address and the offset to locate a specific cache line (or cache lines) in main memory 110. Fetching circuitry within translator 108 issues a load request to main memory 110. This fetching circuitry subsequently receives the cache line from the physical address in main memory 110. The fetching circuitry then forwards the cache line to L2 cache 106.

Object cache lines differ from conventional physical cache lines because object cache lines can start on arbitrary word boundaries, whereas physical cache lines are delineated by larger power-of-two address boundaries. Hence, physical cache lines and object cache lines may not always align. For example, a physical cache line with a length of 64 bytes typically starts at a physical address that is a multiple of 64. Objects, however, may start on any physical address which is a multiple of four in a 32-bit system. Thus, a 64-byte object cache line starting at address 44 includes addresses (44 . . . 107). This overlaps with physical cache lines (0 . . . 63) and (64 . . . 127). In this case, the object is split across two physical cache lines. Hence, two memory read operations are required to retrieve the entire object cache line. Once both physical cache lines have been retrieved, the portions of the cache lines containing the object cache line, (44 . . . 63) and (64 . . . 107), are concatenated together to form the object cache line (44 . . . 107). Other portions of the physical cache lines are discarded.

In the event of an eviction from L2 cache 106, translator 108 converts the encoded address containing the object ID and the offset into a physical address. The fetching circuitry subsequently uses the physical address to generate a store operation to store the evicted cache line in main memory 110. Note that during the process of evicting an object line, the system may have to perform read-modify-write operations on two physical cache lines.

Note that processors 102 and 103 are configured to handle the extended address encoding procedure described above. In one embodiment of the present invention, a platform-independent virtual machine, such as a JAVA VIRTUAL MACHINE, is modified to generate requests for portions of an object using an object ID and an offset. Moreover, in one embodiment of the present invention, processors 102 and 103 are configured to execute special instructions for performing load and store operations involving an object ID and an offset—in addition to normal load and store instructions that use virtual addresses.

Although the present invention is described with reference to a computer system 100 with two levels of cache, the present invention can generally be used with any single-level or multi-level caching structure. Furthermore, although computer system 100 as illustrated in FIG. 1 includes two processors, the present invention applies to computer systems with any number of processors.

Multiple-Translator System with Cache-Coherence Mechanism

Figure 2:
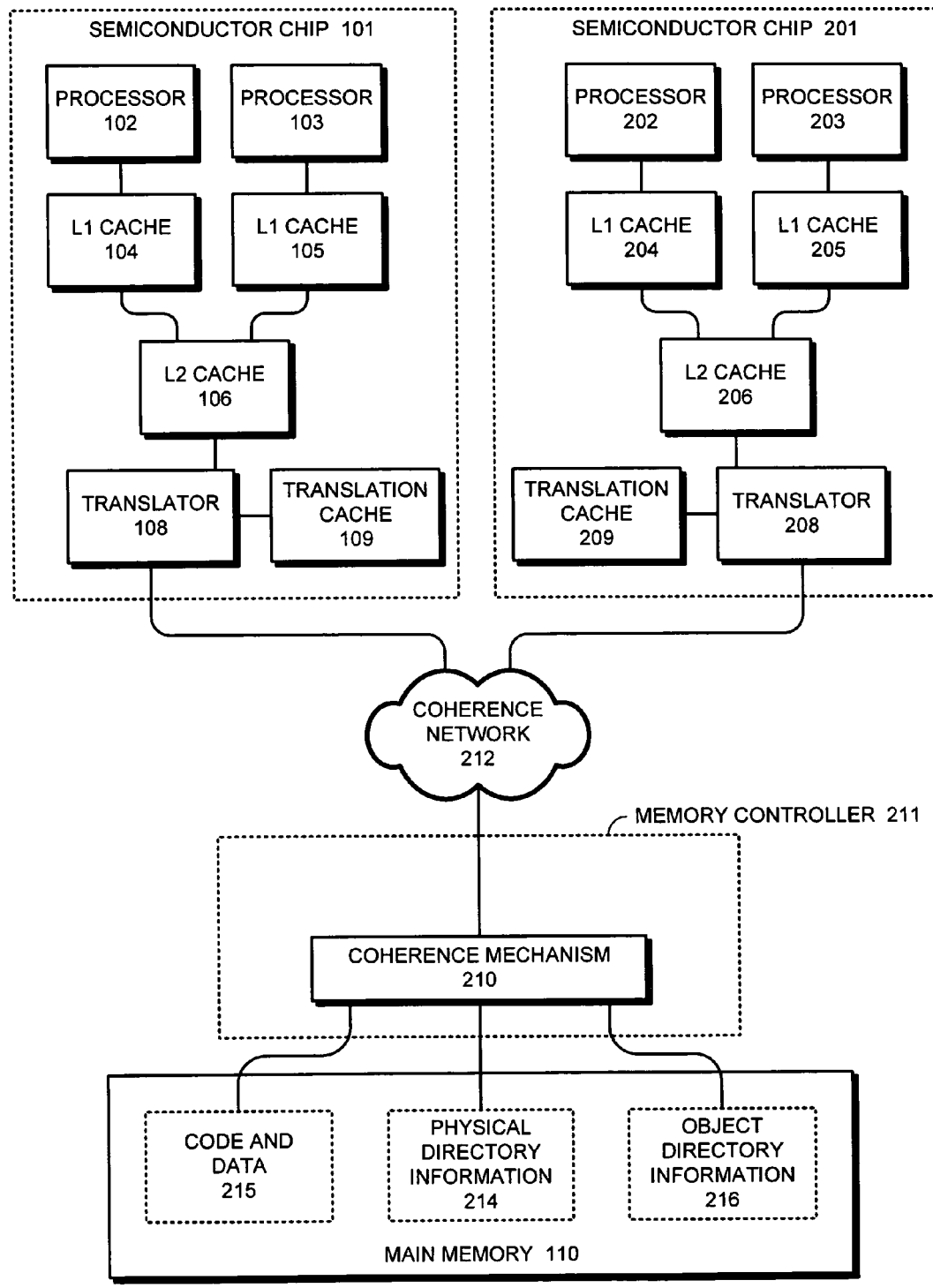
FIG. 2 illustrates a directory-based coherence mechanism within a computer system in accordance with an embodiment of the present invention.

FIG. 2 illustrates a computer system that includes multiple translators as well as a directory-based coherence mechanism in accordance with an embodiment of the present invention. The computer system illustrated in FIG. 2 is the same as the computer system illustrated in FIG. 1, except that it includes another semiconductor chip 201, which contains two additional processors 202–203, associated L1 caches 204–205, L2 cache 206, and translator 208. Translator 208 is coupled to coherence network 212, which is also coupled to memory controller 211, and to translator 108 in semiconductor chip 101.

Coherence network 212 is part of a directory-based cache-coherence system, which maintains coherence between copies of cache lines in L1 caches 104–105, L2 cache 106, L1 caches 204–205, L2 cache 206, translators 108 and 208, translation caches 109 and 209, and main memory 110. In doing so, coherence network 212 operates in concert with coherence mechanism 210 in memory controller 211 to perform coherence transactions. As is illustrated in FIG. 2, main memory 110 contains code and data 215, physical directory information 214, and object directory information 216.

Figure 4A:
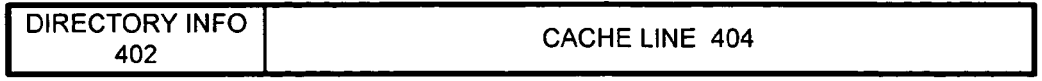
FIG. 4A illustrates how directory information can be stored along with a conventional physical cache line in main memory.

While performing coherence transactions, coherence mechanism 210 accesses directory information from main memory 110. More specifically, coherence mechanism 210 accesses physical directory information 214 in main memory 110, which specifies where copies of physically-addressed cache lines are located in the above-listed caches. In one embodiment of the present invention, directory information 402 for a specific physically-addressed cache line can be stored alongside the cache line 404 in main memory 110 (see FIG. 4A).

Referring back to FIG. 2, coherence mechanism 210 also accesses object directory information 216 in main memory 110, which specifies where copies of object-addressed cache lines are located in the above-listed caches.

Object directory information 216 can be stored as an array or a hash table, wherein object identifiers and offsets are mapped to the directory entries. Note that directory information need only be maintained for object cache lines that are present in one of the computer system's caches. As such, the size of the table can be bounded based on the maximum amount of cache memory in the system. Furthermore, the associativity of the table can be bounded by the associativities of the caches and the number of caches.

Figure 4B:
FIG. 4B illustrates how directory information can be stored for object-addressed cache lines in main memory in accordance with an embodiment of the present invention.

As is illustrated in FIG. 4B, in one embodiment of the present invention, directory information for multiple object-addressed cache lines can be stored in the same physical cache line. More specifically, tag 406, containing an object identifier and offset for a first cache line, is stored with corresponding directory information 408 for the first cache line. Similarly, tag 410, containing an object identifier and offset for a second cache line, is stored with corresponding directory information 412 for the second cache line.

The fact that data need not be stored for object cache lines makes it possible to store several object directory entries in the same cache line. This makes it possible to implement a hash table structure, wherein entries in the same hash bucket fall into the same physical cache line. This facilitates performing a hash lookup without requiring multiple memory accesses to follow pointers within a hash bucket.

Processing a Coherence Transaction

Figure 3:
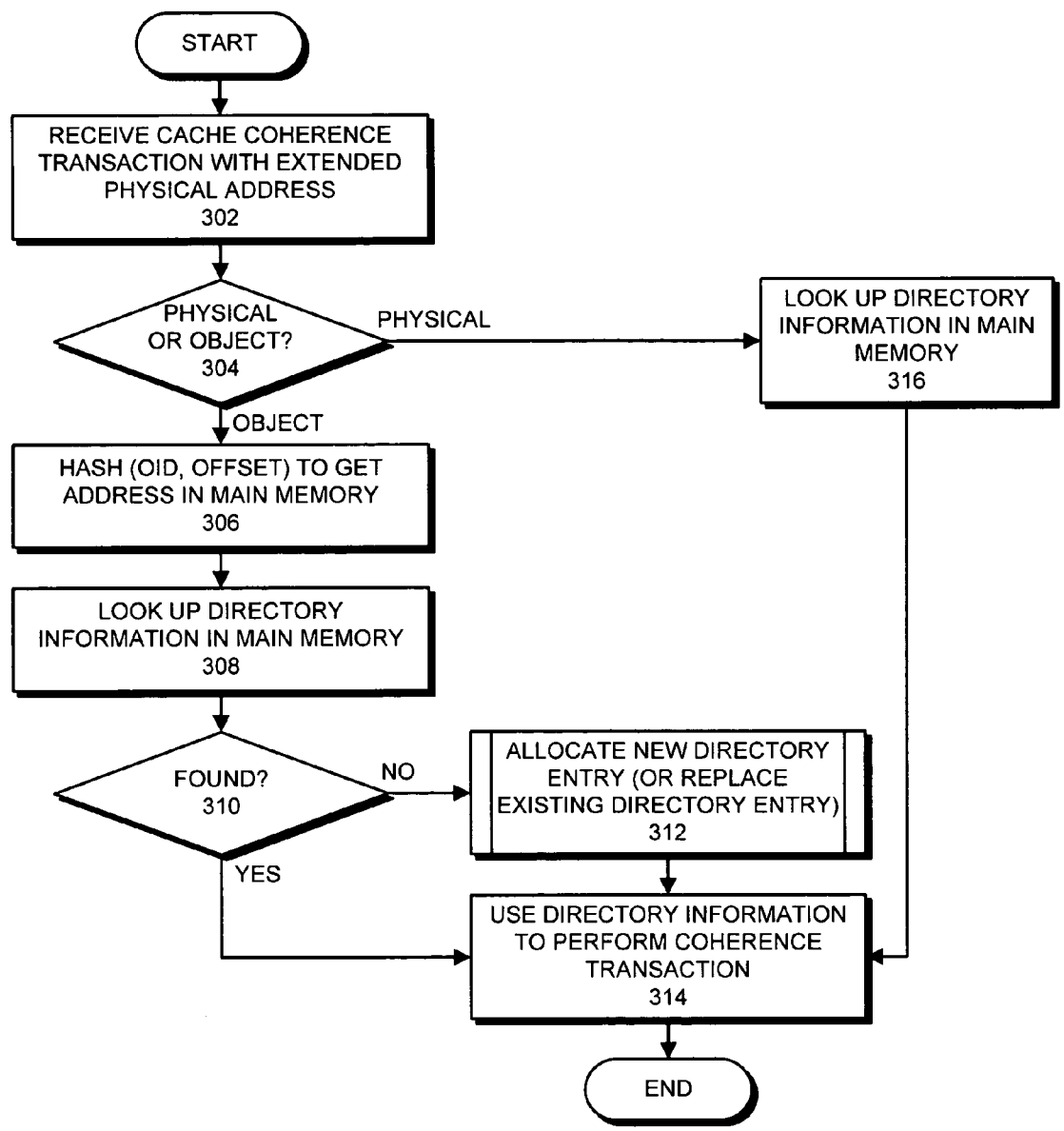
FIG. 3 presents a flow chart illustrating how a coherence transaction is processed in accordance with an embodiment of the present invention.

FIG. 3 presents a flow chart illustrating how a coherence transaction is processed in accordance with an embodiment of the present invention. During operation, coherence mechanism 210 within memory controller 211 receives a coherence transaction, which includes an extended physical address. Recall that this extended physical address can either be a physical address or an object identifier and corresponding object offset (step 302). Note that this coherence transaction can include any type of memory operation and/or related cache-coherence signal. For example, a coherence transaction can include: a store of a cache line; a load of a cache line in a read-only (shared) state; a load of a cache line in a writable (exclusive) state; an invalidation of a cache line; or any other change in a cache-coherence-related state of a cache line.

Next, the system examines the extended physical address to determine whether the associated cache line is a physically-addressed cache line or an object-addressed cache line (step 304).

If the associated cache line is an object-addressed cache line, coherence mechanism 210 evaluates a hash function on the object identifier and offset to produce a corresponding address in main memory 110 (step 306). Next, the system uses the address to look up an entry containing directory information for the cache line in main memory 110 (step 308).

If the entry is found, the system uses the directory information to perform the coherence transaction (step 314). For example, if the coherence transaction is an invalidation of a given cache line, the system can use the directory information to send invalidation signals to all copies of the given cache line.

Otherwise, if the entry for the object addressed cache line is not found in main memory 110, the system creates a directory entry for the cache line (step 312). This can involve allocating a new directory entry or replacing an existing directory entry. The system then uses the directory information to perform the coherence transaction (step 314).

If at step 304, the extended physical address indicates the associated cache line is a physically-addressed cache line, the system uses the extended physical address to look up directory information for the cache line in main memory 110 (step 316). Next, the system proceeds to step 314, where it uses the directory information to perform the coherence transaction.

Replacing a Directory Entry

Figure 5:
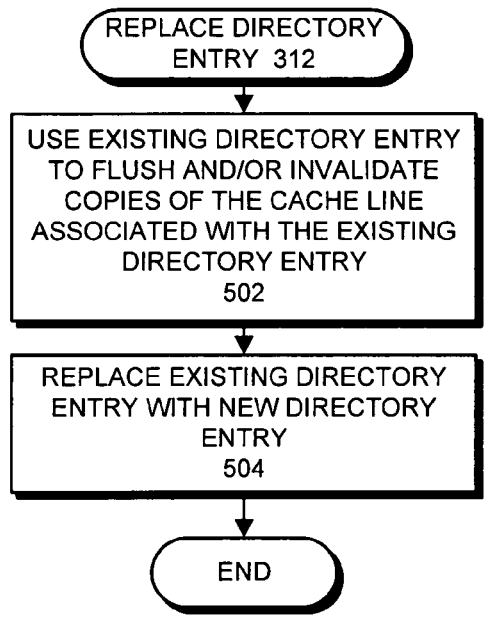
FIG. 5 presents a flow chart illustrating the process of replacing a directory entry in accordance with an embodiment of the present invention.

FIG. 5 presents a flow chart illustrating the process of replacing a directory entry in accordance with an embodiment of the present invention. In many cases, an existing directory entry has to be replaced to make room for a new directory entry. This might be caused, for example, by a collision in a hash bucket for directory information. In order to perform the replacement, the system first uses directory information for the existing cache line to flush and/or invalidate all copies of the existing cache line that are located in caches in the computer system (step 502). Performing these invalidations ensures that any line in a cache has an associated directory entry. Next, the system replaces the existing directory entry with the new directory entry (step 504).

Dealing with Multiple Translators

As was mentioned above in the Summary, if there are multiple translators, coherence problems can potentially arise. For example, if one translator processes an eviction of an object cache line at the same time as another translator processes a read-translation of the same object cache line, it is possible for an inconsistent translation to be generated.

This problem can be remedied by properly establishing ownership of the cache line that is being translated. A cache miss requires either a cache line in a shared state for reading (read-to-share, RTS), or in an exclusive state for writing (read-to-own, RTO). Existing cache coherence protocols already guarantee that ownership is unique and that the owner of a cache line will respond to an RTS or RTO with data. Thus, a translation will only be initiated if there is no owner for the cache line.

One embodiment of the present invention modifies a translator so that translations always produce an owned copy of the cache line. In the case of directory-based cache-coherence systems, this involves an RTS-RTO conversion by the directory (which is described in more detail below).

In this case, a cache-coherence mechanism in the memory controller converts an RTS which causes a translation into an RTO and records the processor/translator which holds the newly created cache line as the owner. This avoids the problem of multiple simultaneous translations of the same object cache line because future cache misses (which would have caused translations) will instead be forwarded to the new owner, and this new owner will respond when the first translation completes.

Note that a conventional RTO, despite its name, is really trying to get a cache line in an exclusive state for writing (and ownership goes along with that once the store is done). Hence, in one embodiment of the present invention, the directory converts an RTS into a new transaction which confers ownership but not exclusivity; this is not a conventional state transition.

RTS in a Directory-Based Cache-Coherence System

Figure 6:
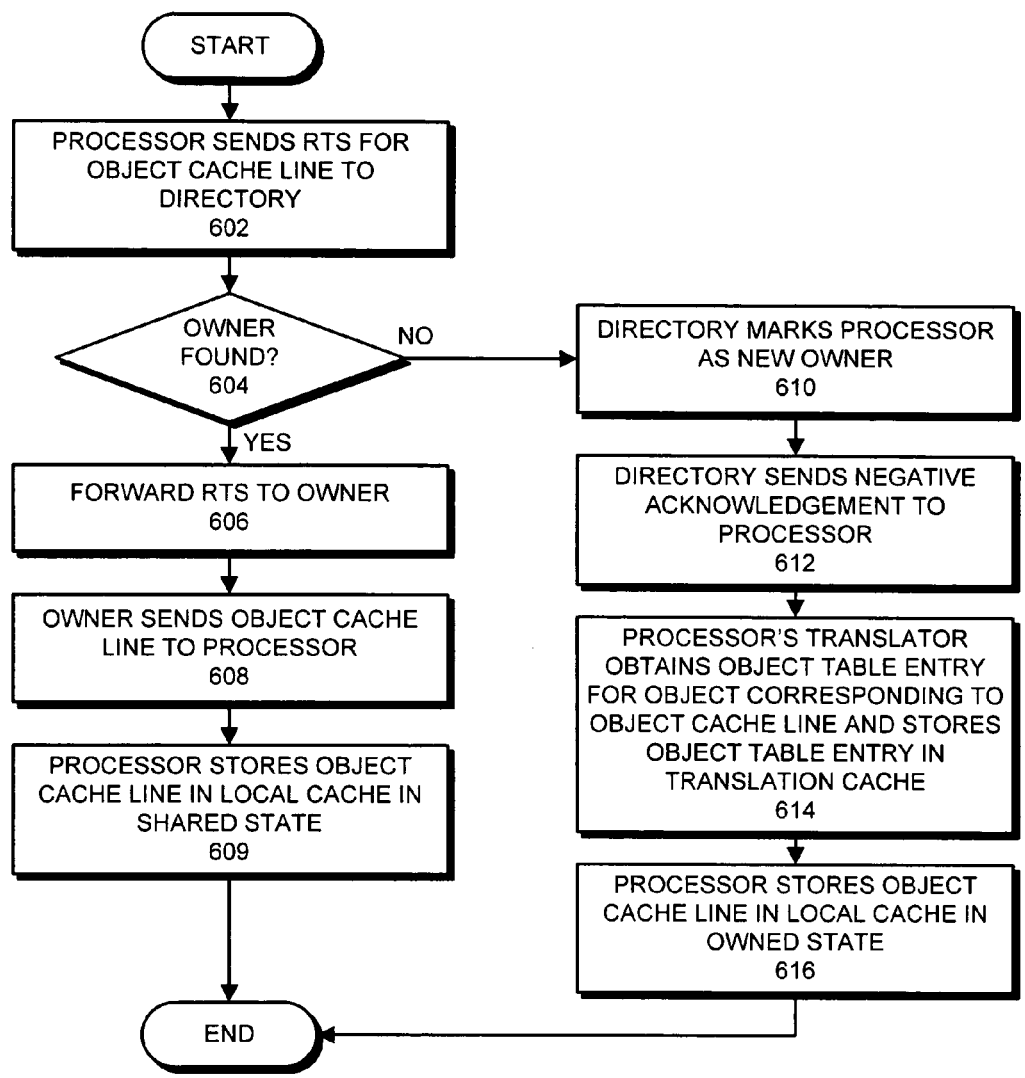
FIG. 6 presents a flow chart illustrating how an RTS is processed in a directory-based cache coherence system in accordance with an embodiment of the present invention.

FIG. 6 presents a flow chart illustrating how an RTS is processed in a directory-based cache coherence system in accordance with an embodiment of the present invention. The process starts when a cache miss causes a processor to send an RTS for an object cache line to a directory-based cache coherence mechanism (step 602). The directory-based cache coherence mechanism then determines from the directory information if there is an owner for the object cache line (step 604). If so, the system forwards the RTS to the owner of the cache line (step 606). In response to the RTS, the owner of the object cache line sends the object cache line to the requesting processor (step 608), and the requesting processor stores the object cache line in an object cache in the shared state (step 609).

On the other hand, if at step 604 no owner is found for the object cache line, the system marks the directory information to indicate that the requesting processor is the new owner of the object cache line (step 610). Next, the directory-based cache coherence mechanism sends an acknowledgement (possibly a negative acknowledgement) to the requesting processor (step 612). The requesting processor's translator subsequently obtains an object table entry for the object corresponding to the object cache line and stores the object table entry in its local translation cache (step 614). The system then uses the physical address contained in the object table entry to reconstruct the object cache line from main memory, and the object cache line is stored in a local cache for the requesting processor in the owned state (step 616).

RTS in a Shared-Bus Cache-Coherence System

Figure 7:
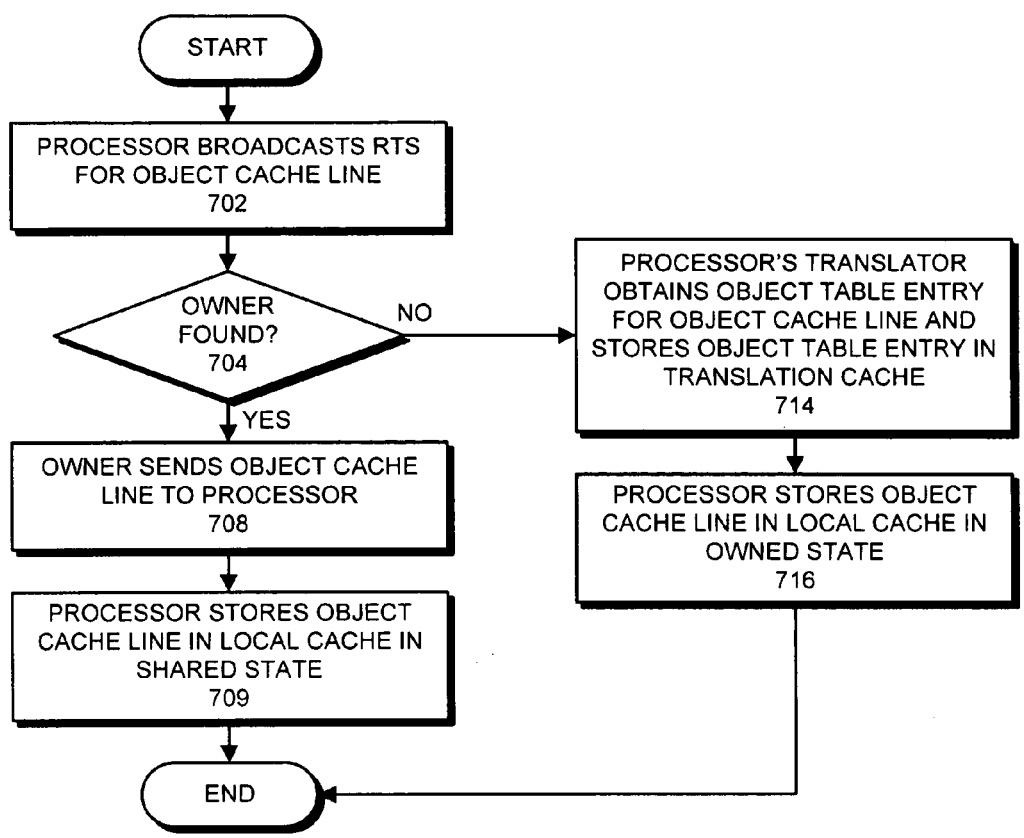
FIG. 7 presents a flow chart illustrating how an RTS is processed in a shared-bus cache coherence system in accordance with an embodiment of the present invention.

FIG. 7 presents a flow chart illustrating how an RTS is processed in a shared-bus cache coherence system in accordance with an embodiment of the present invention. The process starts when a cache miss causes a processor to broadcast an RTS for an object cache line onto a shared coherence bus (step 702). The system then determines if there is an owner for the object cache line by waiting for an owner of the cache line to respond on the shared bus (step 704). If there is an owner, the owner of the object cache line sends the object cache line to the requesting processor (step 708), and the requesting processor stores the object cache line in its local object cache in the shared state (step 709).

On the other hand, if at step 704 no owner is found for the object cache line, the requesting processor's translator obtains an object table entry for the object cache line and stores the object table entry in its local translation cache (step 714). The system then uses the physical address contained in the object table entry to reconstruct the object cache line from main memory, and the object cache line is stored in a local object cache for the requesting processor in the owned state (step 716).

Cache Line Eviction

Figure 8:
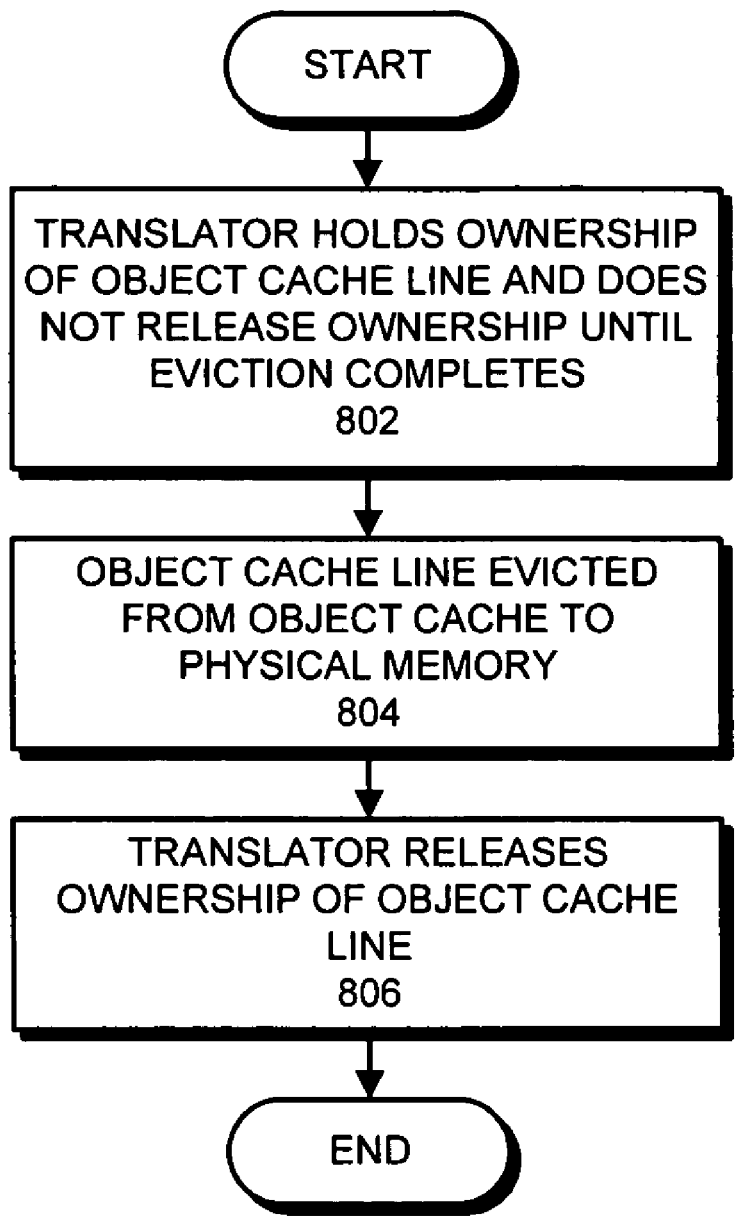
FIG. 8 presents a flow chart illustrating how a cache line is evicted in accordance with an embodiment of the present invention.

FIG. 8 presents a flow chart illustrating how a cache line is evicted in accordance with an embodiment of the present invention. At some point during system operation, an object cache line has to be evicted. In this case, the translator holds ownership of the object cache line and does not release ownership until the eviction completes (step 802). Next, the object cache line is evicted from the object cache to physical memory (step 804). After the eviction completes, the translator releases ownership of the object cache line (step 806). By holding ownership of the object cache line, the system ensures that write-back and read translations are ordered properly.

Dealing with Conflicts During Read Translation

Figure 9:
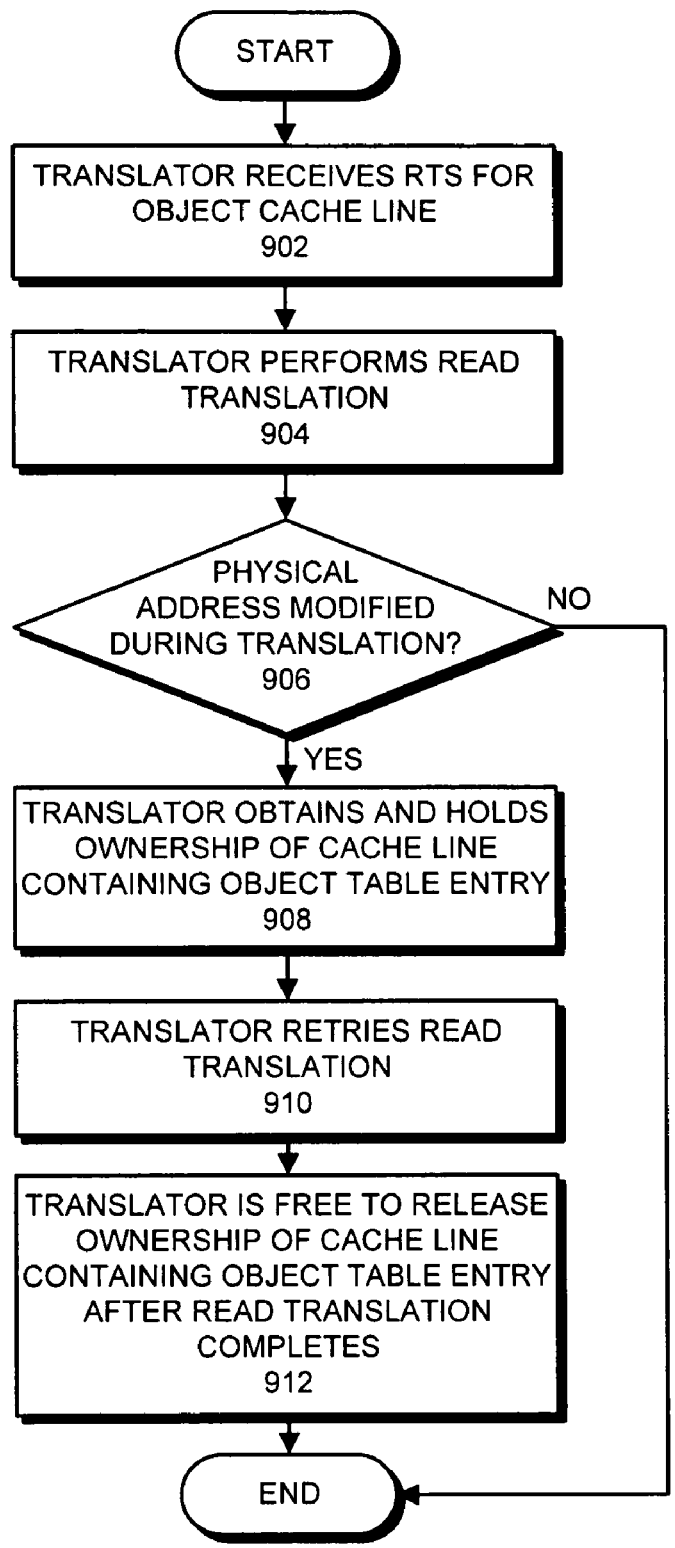
FIG. 9 presents a flow chart illustrating how a read translation is aborted and retried if the object's physical address is modified in the middle of translation in accordance with an embodiment of the present invention.

FIG. 9 presents a flow chart illustrating how a read translation is aborted and retried if an object's physical address is modified in the middle of a translation in accordance with an embodiment of the present invention. During operation, a translator receives an RTS for an object cache line (step 902). If no other processor owns the object cache line, the translator performs a read translation to identify where the object cache line is stored in main memory (step 904).

Next, the system determines if the physical address in the translation has been modified during the translation (step 906); this can be accomplished by reading the physical address twice to see if the physical address changed, or, in an alternative embodiment, by receiving an invalidation request for the cache line containing the object table entry. If the physical address is not modified, the read translation was successful, and the system uses the physical address to retrieve the object cache line from main memory and the process is complete.

Otherwise, if the physical address was modified and the read translation was not successful, the system retries the translation. Before trying the translation, the translator obtains and holds ownership of a cache line containing the object table entry (step 908). (This cache line is contained in a translation cache associated with the translator.) The translator then retries the translation (step 910). Next, after the read translation completes, the system is free to release ownership of the cache line containing the object table entry (step 912).

Note that the system ensures forward progress by obtaining and holding ownership of the cache line containing the object table entry for the duration of the translation. Otherwise, it is possible for two processors to continually interfere with each other while performing the same read translation. Also note that, in the case of recursive translations using a hierarchical object table, forward progress is ensured because ownership of cache lines containing object table entries is acquired in a fixed order from the leaf objects up to the root of the object table hierarchy.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for avoiding inconsistencies between multiple translators in an object-addressed memory hierarchy in a computer system, wherein the object-addressed memory hierarchy supports referencing object cache lines in an object cache based on an object identifier instead of a physical address, the method comprising:

receiving a read-to-share (RTS) signal for an object cache line, wherein the RTS signal is received from a requesting processor as part of a cache-coherence operation; and if no processor owns the object cache line,
causing the requesting processor to become owner of the object cache line instead of merely holding a copy of the object cache line in a shared state, and
performing a translation for the object cache line in a translator associated with the requesting processor, wherein the translation maps an object identifier and a corresponding offset to a physical address for the object cache line and reconstructs contents of the object cache line by reading from memory at the physical address;

whereby if the requesting processor owns the object cache line, a subsequent processor that requests the same object cache line will receive the object cache line from the requesting processor, and will not perform an additional translation for the object cache line, thereby ensuring that multiple translators will not generate inconsistent translations for the same object cache line.

2. The method of claim 1, wherein if another processor owns the object cache line, the other processor forwards the object cache line to the requesting processor, and the requesting processor holds a copy of the object cache line in the shared state.

3. The method of claim 1,
wherein the method further comprises using a corresponding object identifier and offset to look up directory information specifying where copies of the object cache line are located in caches in the computer system; and
wherein causing the requesting processor to become the owner of the object cache line involves updating the directory information to indicate that the requesting processor is the owner of the object cache line.

4. The method of claim 1, wherein obtaining the physical address for the object cache line involves:
looking up an object table entry for the object corresponding to the object cache line in a translation cache associated with the translator; and
if the object table entry is not present in the translation cache, generating an RTS signal to request a cache line containing the object table entry.

5. The method of claim 1, wherein the method further comprises evicting the object cache line from an object cache associated with the requesting processor by:
holding ownership of the object cache line and not releasing ownership while the eviction takes place;
performing an eviction by writing the object cache line from the object cache to a physical memory location derived from the object table entry of the object corresponding to the object cache line, and then invalidating or otherwise overwriting an entry in the object cache for the object cache line; and
releasing ownership of object cache line after the eviction completes.

6. The method of claim 1, wherein if the translator performs a read translation for an object cache line, and if the physical address associated with an object cache line is modified during the read translation, the read translation is aborted.

7. The method of claim 6,
wherein after the read translation is aborted, the method further comprises retrying the read translation;
wherein while retrying the read translation, the translator obtains ownership of a cache line that contains the object table entry, and does not relinquish ownership until the read translation completes; and
wherein after the read translation completes, the translator releases ownership of the cache line containing the object table entry;
whereby the object cache line cannot be relocated by another processor during the retry of the read translation.

8. The method of claim 1, wherein object cache lines are used to store objects defined within an object-oriented programming system.

9. An apparatus that avoids inconsistencies between multiple translators in an object-addressed memory hierarchy in a computer system, comprising:
the object-addressed memory hierarchy that supports referencing object cache lines in an object cache based on an object identifier instead of a physical address;
a cache coherence mechanism configured to generate a read-to-share (RTS) signal for an object cache line as part of a cache-coherence operation; and
wherein if no processor owns the object cache line,
the cache coherence mechanism is configured to cause the requesting processor to become owner of the object cache line instead of merely holding a copy of the object cache line in a shared state, and
a translator associated with the requesting processor is configured to obtain a physical address for the object cache line, and to reconstruct contents of the object cache line by reading from memory at that physical address;
whereby if the requesting processor owns the object cache line, a subsequent processor that requests the same object cache line will receive the object cache line from the requesting processor, and will not perform an additional translation for the object cache line, thereby ensuring that multiple translators will not generate inconsistent translations for the same object cache line.

10. The apparatus of claim 9, wherein if another processor owns the object cache line, the other processor forwards the object cache line to the requesting processor, and the requesting processor holds a copy of the object cache line in the shared state.

11. The apparatus of claim 9,
wherein the cache coherence mechanism is configured to use a corresponding object identifier and offset to look up directory information specifying where copies of the object cache line are located in caches in the computer system; and
wherein the cache coherence mechanism is configured to cause the requesting processor to become the owner of the object cache line by updating the directory information to indicate that the requesting processor is the owner of the object cache line.

12. The apparatus of claim 9, wherein while generating the translation for the object cache line, the translator is configured to:
compute the physical address for an object cache line by looking up the object table entry for the object corresponding to the object cache line in a translation cache associated with the translator; and
if the object table entry is not present in the translation cache, to generate an RTS signal to request a cache line containing the object table entry.

13. The apparatus of claim 9, wherein the cache coherence mechanism and an object cache associated with the requesting processor are configured to evict the object cache line from the object cache associated by:
holding ownership of the object cache line and not releasing ownership while the eviction takes place;
performing an eviction by writing the object cache line from the object cache to a physical memory location derived from the object table entry of the object corresponding to the object cache line, and then invalidating or otherwise overwriting an entry in the object cache for the object cache line; and
releasing ownership of object cache line after the eviction completes.

14. The apparatus of claim 9, wherein if the translator performs a read translation for an object cache line, and if the physical address associated with an object cache line is modified during the read translation, the translator is configured to abort the read translation.

15. The apparatus of claim 14,
wherein after the read translation is aborted, the translator is configured to retry the read translation;
wherein while retrying the read translation, the translator obtains ownership of a cache line that contains the physical address translation, and does not relinquish ownership until the read translation completes; and
wherein after the read translation completes, the translator releases ownership of the cache line containing the object table entry;
whereby the object cache line cannot be relocated by another processor during the retry of the read translation.

16. The apparatus of claim 9, wherein object cache lines are used to store objects defined within an object-oriented programming system.

17. A computer system that avoids inconsistencies between multiple translators in an object-addressed memory hierarchy, comprising:
a plurality of processors;
a plurality of caches;
the object-addressed memory hierarchy that supports referencing object cache lines in an object cache within the plurality of caches based on an object identifier instead of a physical address;
a cache coherence mechanism configured to generate a read-to-share (RTS) signal for an object cache line, wherein the RTS signal is generated for a requesting processor in the plurality of processors as part of a cache-coherence operation; and
wherein if no processor owns the object cache line,
the cache coherence mechanism is configured to cause the requesting processor to become owner of the object cache line instead of merely holding a copy of the object cache line in a shared state, and
a translator associated with the requesting processor is configured to obtain a physical address for the object cache line, and to reconstruct contents of the object cache line by reading from memory at that physical address;
whereby if the requesting processor owns the object cache line, a subsequent processor that requests the same object cache line will receive the object cache line from the requesting processor, and will not perform an additional translation for the object cache line, thereby ensuring that multiple translators will not generate inconsistent translations for the same object cache line.

18. The computer system of claim 17, wherein if another processor owns the object cache line, the other processor forwards the object cache line to the requesting processor, and the requesting processor holds a copy of the object cache line in the shared state.

* * * * *

UNITED STATES PATENT AND TRADEMARK OFFICE
CERTIFICATE OF CORRECTION

PATENT NO.        : 7,167,956 B1                                  Page 1 of 1
APPLICATION NO.   : 10/838309
DATED             : January 23, 2007
INVENTOR(S)       : Gregory M. Wright et al.

It is certified that error appears in the above-identified patent and that said Letters Patent is hereby corrected as shown below:

On The Title Page, Item (73) Assignee section please delete the city "San Clara" and replace with the city --Santa Clara--.

Signed and Sealed this

Twenty-seventh Day of March, 2007

JON W. DUDAS
*Director of the United States Patent and Trademark Office*